UNITED STATES PATENT OFFICE.

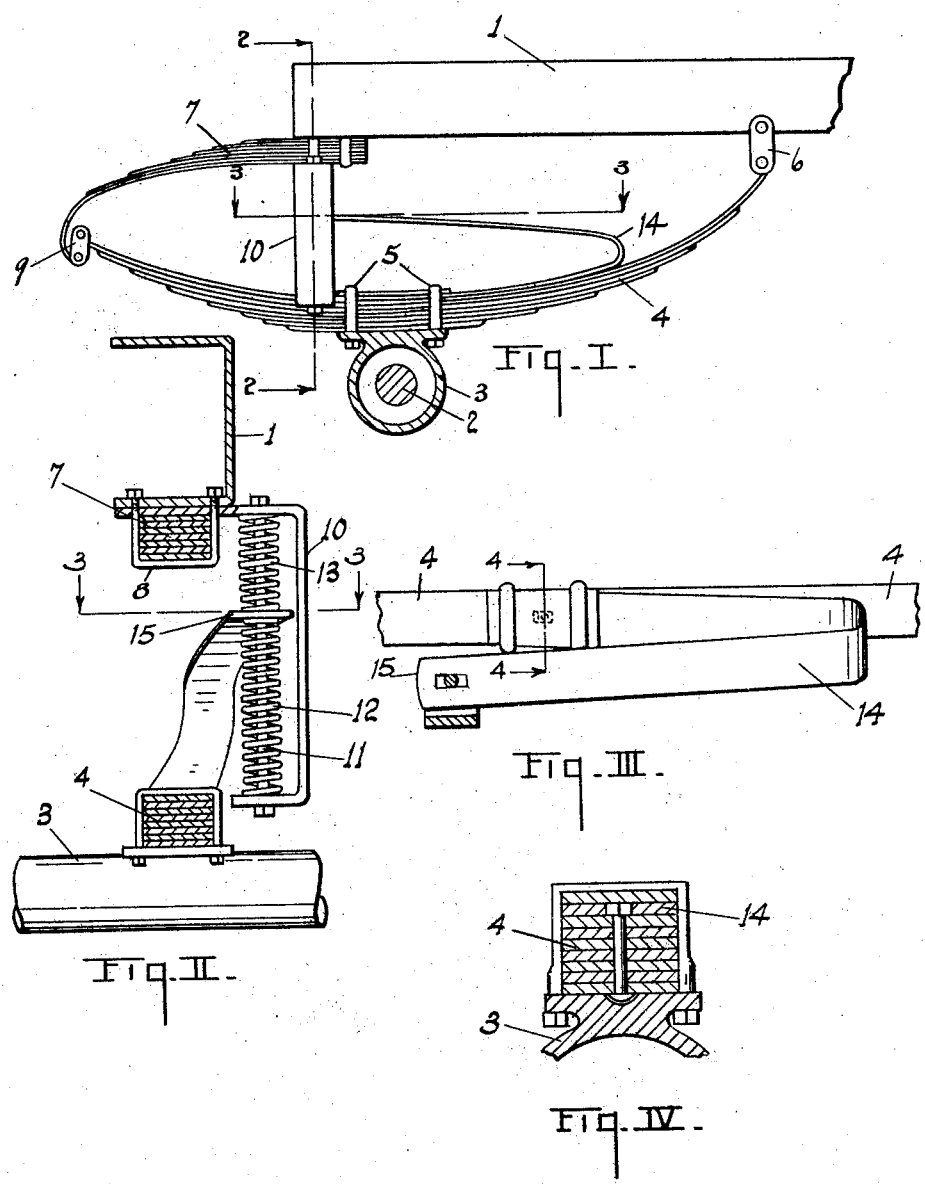

MICHAEL J. MAGIN AND WILLIAM G. BIEK, OF DOWAGIAC, MICHIGAN.

SHOCK-ABSORBER.

1,389,591.   Specification of Letters Patent.   Patented Sept. 6, 1921.

Application filed March 21, 1921. Serial No. 453,919.

*To all whom it may concern:*

Be it known that we, MICHAEL J. MAGIN and WILLIAM G. BIEK, citizens of the United States, residing at Dowagiac, county of Cass, State of Michigan, have invented certain new and useful Improvements in Shock-Absorbers, of which the following is a specification.

This invention relates to improvements in shock absorbers.

The main objects of this invention are:

First, to provide an improved shock absorber which may be conveniently applied to vehicles equipped with springs of well-known type.

Second, to provide an improved shock absorber which is effective as a shock absorber and does not objectionably stiffen the supporting springs with which the vehicle is equipped.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this specification, in which:

Figure I is a side view of a motor vehicle structure embodying the features of our invention, only such portions of the vehicle being illustrated as are deemed necessary to illustrate an embodiment or adaptation of our invention.

Fig. II is an enlarged detail view partially in vertical section on a line corresponding to line 2—2 of Fig. I.

Fig. III is a detail horizontal section on a line corresponding to line 3—3 of Figs. I and II.

Fig. IV is a detail vertical section on a line corresponding to line 4—4 of Fig. III.

In the drawing similar reference characters refer to similar parts throughout the several views, and the sectional views are taken looking in the direction of the little arrows at the ends of the section lines.

Referring to the drawing, 1 represents a spring supported body member. 2 the axle and 3 the axle housing of a motor vehicle.

The body carrying springs comprise the semi-elliptic spring member 4 secured to the axle housing by the clips 5, the front end of the spring being secured to the body member 1 by the hanger 6. The rear end of the spring 4 is connected to the body member 1 by the quarter elliptic spring 7 secured to the body member at 8 and to the rear end of the spring 4 by the link 9. These parts are of the well-known leaf construction.

We secure to the body, preferably by means of the clip 8, a hanger 10 carrying the vertical spring supporting rod 11. On this rod are coiled springs 12 and 13. Connecting with these springs is a U-shaped spring member 14 having its upper arm 15 engaged upon the rod 11 between the springs 12 and 13 and the other arm secured to the spring member 4 by means of its clips 5.

With this arrangement of parts the shocks and rebound are substantially eliminated and without stiffening the main springs of the vehicle to an objectionable extent.

We have illustrated and described an adaptation of our improvements to a vehicle spring of a type in quite common use. Our improvements may also be adapted to certain other types of springs.

Having thus described our invention, what we claim as new and desire to secure by Letters Patent, is:

1. In a structure of the class described, the combination with an axle and a spring supported body member, of a body carrying spring comprising a semi-elliptic spring member mounted on said axle, a hanger member on said body member having a vertical spring supporting rod thereon, a U-shaped spring member having one arm mounted on said spring member carried by the axle and the other slidably engaged with said rod on said hanger, and coiled springs arranged on said rod on each side of the spring member arm engaged therewith.

2. In a structure of the class described, the combination with an axle and a spring supported body member, of a body carrying spring, a hanger member on said body member having a vertical spring supporting rod thereon, a U-shaped spring member having one arm mounted on said axle and the other slidably engaged with said rod on said hanger, and coiled springs arranged on said rod on each side of the spring member arm engaged therewith.

3. In a structure of the class described, the combination with an axle and a spring supported body member, of a body carrying spring mounted on said axle, a hanger member on said body member having a vertical spring supporting rod thereon, coiled springs arranged on said rod, and a U-shaped spring member having one arm mounted on said axle and the other operatively associated with said springs on said hanger, for the purpose specified.

4. In a structure of the class described, the combination with an axle and a spring supported body member, of a body carrying spring, a hanger member on said body member, coiled springs mounted thereon in opposed relation, and a U-shaped spring member having one arm mounted on said axle and the other operatively associated with said opposed spring, for the purpose specified.

In witness whereof, we have hereunto set our hands and seals in the presence of two witnesses.

MICHAEL J. MAGIN. [L. S.]
WILLIAM G. BIEK. [L. S.]

Witnesses:
L. L. BASCOME,
JOS. A. KUZIZA.